United States Patent
Date et al.

(10) Patent No.: US 7,831,413 B2
(45) Date of Patent: Nov. 9, 2010

(54) SOUND FIELD MEASURING METHOD AND SOUND FIELD MEASURING DEVICE

(75) Inventors: Toshihiko Date, Nara (JP); Kazue Satoh, Osaka (JP); Hiroyuki Kano, Hyogo (JP)

(73) Assignee: Panasonic Corporation, Osaka (JP)

( * ) Notice: Subject to any disclaimer, the term of this patent is extended or adjusted under 35 U.S.C. 154(b) by 901 days.

(21) Appl. No.: 11/663,544

(22) PCT Filed: Sep. 27, 2005

(86) PCT No.: PCT/JP2005/017759

§ 371 (c)(1),
(2), (4) Date: Mar. 22, 2007

(87) PCT Pub. No.: WO2006/035776

PCT Pub. Date: Apr. 6, 2006

(65) Prior Publication Data

US 2009/0193895 A1    Aug. 6, 2009

(30) Foreign Application Priority Data

Sep. 29, 2004   (JP) .............................. 2004-284366

(51) Int. Cl.
*H03F 1/26* (2006.01)
(52) U.S. Cl. ..................................... 702/189
(58) Field of Classification Search .................. 702/189
See application file for complete search history.

(56) References Cited

U.S. PATENT DOCUMENTS

| | | | |
|---|---|---|---|
| 2002/0062695 A1* | 5/2002 | Ohta ........................... | 73/645 |
| 2004/0240676 A1* | 12/2004 | Hashimoto et al. ............ | 381/56 |
| 2007/0019815 A1* | 1/2007 | Asada et al. .................. | 381/58 |

FOREIGN PATENT DOCUMENTS

| JP | 2725838 | 12/1997 |
|---|---|---|
| JP | 2867769 | 12/1998 |

OTHER PUBLICATIONS

Masanori Morise et al., "Ansoon ni Ganken na Impulse Oto Sokuteiyo Shingo no Sekkei Shuho", The Institute of Electronics, Information and Communication Engineers Gijutsu Kenkyu Hokoku, vol. 104, No. 247, Aug. 13, 2004, pp. 37 to 42.

* cited by examiner

*Primary Examiner*—Aditya Bhat
(74) *Attorney, Agent, or Firm*—Wenderoth, Lind & Ponack, L.L.P.

(57) ABSTRACT

A sound field measuring device uses a measurement signal which has at least one change point and whose frequency spectrum has a shape corresponding to a shape of a frequency spectrum of a background noise. This enables a sound field measurement, which is for measuring an impulse response or transfer function of a sound field space which is a linear time-invariant system to be measured, to be performed with a high S/N ratio over a wide frequency band.

17 Claims, 8 Drawing Sheets

SOUND FIELD MEASURING METHOD AND SOUND FIELD MEASURING DEVICE

TECHNICAL FIELD

The present invention relates to a sound field measuring method and sound field measuring device for measuring an impulse response or transfer function of a sound field space such as a listening room or vehicle interior space, and particularly to a sound field measuring method and sound field measuring device using a measurement signal which allows a high S/N ratio to be obtained over a wide frequency band.

BACKGROUND ART

Conventionally, there has been a known measurement method for sound field measurement in which an impulse response or transfer function of a sound field space which is a linear time-invariant system to be measured is measured using a measurement signal having a flat frequency spectrum over the entire frequency bands (e.g., patent document 1).

Figure 10:
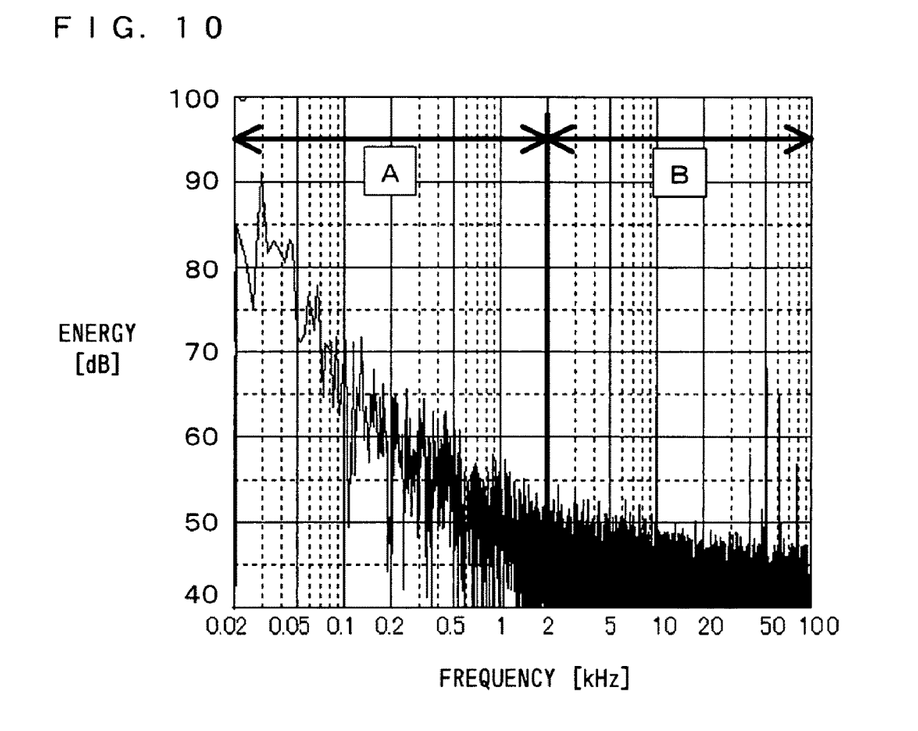
FIG. 10 shows a frequency spectrum of a background noise measured in a listening room.

Here, in order to obtain high S/N ratio when performing the sound field measurement, a noise component in the sound field space, i.e., background noise, is required to be taken into account. Typically, the background noise has a frequency spectrum showing that the lower the frequency band, the higher is the energy level of the background noise (see FIG. 10). Here, FIG. 10 shows the frequency spectrum of the background noise measured in a listening room. The frequency spectrum of the background noise shown in FIG. 10 is such that the lower the frequency in a frequency band A, the higher is the energy level, and in a frequency band B, the energy level is substantially fixed. Accordingly, the above-described conventional sound field measuring method has a problem in that an S/N ratio deteriorates in the frequency band A, because the lower the frequency in the frequency band A, the higher is the energy level of the background noise therein.

Figure 11:
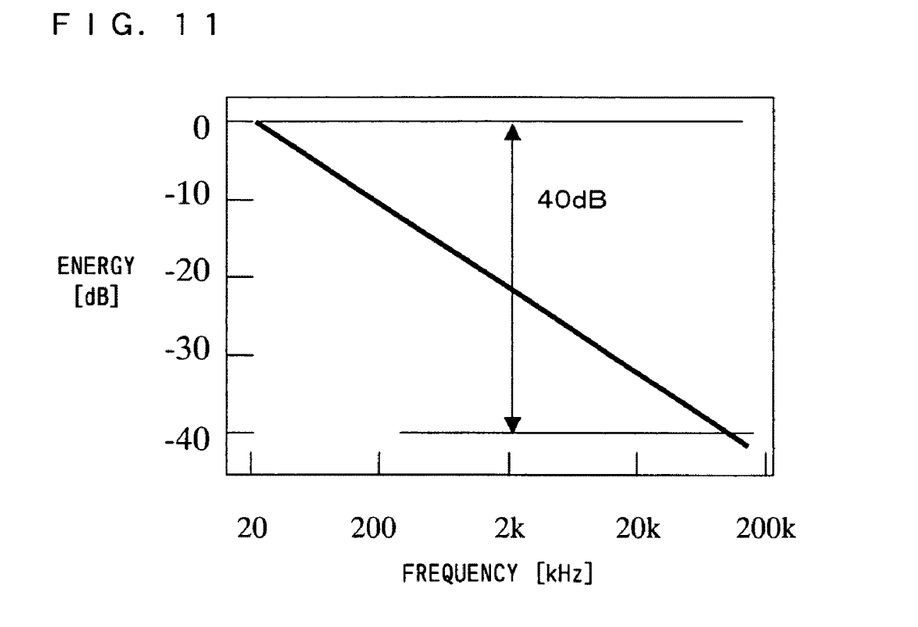
FIG. 11 shows a frequency spectrum of a conventional measurement signal for which a deterioration of S/N ratio in a low-frequency band has been improved.

In order to solve the above problem, a measurement method has been proposed in which such a signal whose frequency spectrum increases by 3 db/Oct from a high frequency band toward a low frequency band as shown in FIG. 11 is used as the measurement signal (refer to, e.g., patent document 2). FIG. 11 shows a frequency spectrum of a conventional measurement signal for which the deterioration of S/N ratio in a low-frequency band has been improved. This measurement signal is generated by sweeping a frequency of a sinusoidal signal in a non-linear (logarithmically proportional) manner such that the frequency changes gradually at a low frequency side and steeply at a high frequency side. By using this measurement signal, a measurement in which an influence from the background noise is reduced particularly in the low frequency band A can be performed.

[Japanese Patent No. 2725838]

[Japanese Patent No. 2867769]

DISCLOSURE OF THE INVENTION

Problems to be Solved by the Invention

In recent years, new audio reproduction apparatuses for, e.g., DVD-audio and SACD have been in practical use. A recording and reproducing band of these apparatuses is as high as 100 kHz. Therefore, when a sound field measurement is performed for a sound field space in which reproduction is performed with such a new audio reproduction apparatus, the measurement is required to be performed for a frequency band up to 100 kHz, which is higher than a conventional measurement.

However, since the energy level of the conventional measurement signal having such a frequency spectrum as shown in FIG. 11 decreases by 3 dB/Oct in accordance with an increase in frequency, the S/N ratio deteriorates by 40 dB in a frequency band from 20 Hz to 100 kHz. Also, the energy level of the background noise shown in FIG. 10 is substantially fixed in the frequency band B. For this reason, the deterioration of S/N ratio is significant particularly in a high frequency band such as the frequency band B. The deterioration is even more significant in a higher frequency band no lower than 20 kHz. Thus, a sound field measurement in which a high S/N ratio is obtained in a high frequency band is very difficult to perform by the conventional sound field measuring method.

Therefore, an object of the present invention is to provide a sound field measuring method and sound field measuring device capable of generating a measurement signal, which allows a high S/N ratio to be obtained over a wide frequency band, and using the measurement signal.

Solution to the Problems

The present invention has the following features to attain the object mentioned above.

In a first aspect of the present invention, in a sound field measuring method for, by a convolution process using an inverse filter for converting a non-impulse measurement signal into an impulse, measuring either one of an impulse response and a transfer function of a sound field space which is a linear time-invariant system to be measured, a signal to be used as the measurement signal has at least one change point at which a characteristic of a frequency spectrum of the measurement signal changes such that a shape of the frequency spectrum corresponds to a frequency spectrum of a background noise of the sound field space.

In a second aspect of the present invention based on the above first aspect, the measurement signal is a sinusoidal signal whose frequency is swept by a sweep manner which is changed between frequencies respectively higher and lower than a frequency of the change point In a third aspect of the present invention based on the above second aspect, the measurement signal is a signal which has a single change point and which is generated by, in a frequency band lower than the change point, sweeping a frequency of the signal in a non-linear manner such that the frequency changes gradually at a low frequency side and steeply at a high frequency side, and in a high frequency band no lower than the change point, sweeping the frequency by a fixed sweep amount.

In a fourth aspect of the present invention based on the above second aspect, the measurement signal is a signal which has a single change point and which is generated by, in a frequency band lower than the change point, sweeping a frequency of the signal in a non-linear manner such that the frequency changes gradually at a low frequency side and steeply at a high frequency side, and in a high frequency band no lower than the change point, sweeping the frequency in a non-linear manner such that the frequency changes steeply at a low frequency side and gradually at a high frequency side.

In a fifth aspect of the present invention based on the above second aspect, the measurement signal is a signal which has two change points and which is generated by, in a frequency band between each of the change points, sweeping a frequency of the signal in a non-linear manner such that the frequency changes gradually at a low frequency side and steeply at a high frequency side, and in a frequency band other than the frequency band between each of the change points, sweeping the frequency by a fixed sweep amount.

In a sixth aspect of the present invention based on the above second aspect, the measurement signal is a signal which has a plurality of change points and which is generated by, in each of frequency bands separated by the change points, sweeping a frequency of the signal by a fixed sweep amount, and the fixed sweep amount for each of the frequency bands decreases in accordance with a frequency increase from one of the frequency bands to another of the frequency bands.

In a seventh aspect of the present invention based on the above second aspect, the measurement signal is a signal which has more than one change point and which is generated by, in each of frequency bands separated by change points, sweeping a frequency of the signal in either one of sweep manners, in one of which the frequency is swept in a non-linear manner such that the frequency changes gradually at a low frequency side and steeply at a high frequency side, and in another of which the frequency is swept in a non-linear manner such that the frequency changes steeply at the low frequency side and gradually at the high frequency side, and in still another of which the frequency is swept by a fixed sweep amount.

In an eighth aspect of the present invention based on the above first aspect, the measurement signal is a random noise.

In a ninth aspect of the present invention based on the above first aspect, the frequency spectrum of the background noise is such that an energy level of the background noise is substantially fixed in a high frequency band no lower than a predetermined frequency, and the measurement signal has the change point at which a frequency is the predetermined frequency, and a characteristic of the frequency spectrum of the measurement signal is such that the measurement signal has, in a high frequency band no lower than the predetermined frequency, an energy level no lower than a predetermined level with respect to the background noise.

In a tenth aspect of the present invention based on the above first aspect, the frequency spectrum of the background noise is measured; at least one change point is determined based on the measured frequency spectrum of the background noise; and the measurement signal is generated based on the determined change point.

An eleventh aspect of the present invention is a sound field measuring device for, by a convolution process using an inverse filter for converting a non-impulse measurement signal into an impulse, measuring either one of an impulse response and a transfer function of a sound field space which is a linear time-invariant system to be measured, the sound field measuring device comprising: a measurement signal storage section for storing, as the measurement signal, a signal having at least one change point at which a characteristic of a frequency spectrum of the measurement signal changes such that a shape of the frequency spectrum corresponds to a frequency spectrum of a background noise of the sound field space; a measurement signal reproduction section for reproducing in the sound field space the measurement signal stored in the measurement signal storage section; a response signal measurement section for measuring a response signal provided from the sound field space, the response signal being responsive to the measurement signal reproduced by the measurement signal reproduction section; and a calculation section for calculating, for the response signal measured by the response signal measurement section, either one of the impulse response and the transfer function of the sound field space by the convolution process using the inverse filter.

In a twelfth aspect of the present invention based on the above eleventh aspect, the measurement signal is a sinusoidal signal whose frequency is swept by a sweep manner which is changed between frequencies respectively higher and lower than a frequency of the change point In a thirteenth aspect of the present invention based on the above twelfth aspect, the measurement signal is a signal which has a single change point and which is generated by, in a frequency band lower than the change point, sweeping a frequency of the signal in a non-linear manner such that the frequency changes gradually at a low frequency side and steeply at a high frequency side, and in a high frequency band no lower than the change point, sweeping the frequency by a fixed sweep amount.

In a fourteenth aspect of the present invention based on the above twelfth aspect, the measurement signal is a signal which has a single change point and which is generated by, in a frequency band lower than the change point, sweeping a frequency of the signal in a non-linear manner such that the frequency changes gradually at a low frequency side and steeply at a high frequency side, and in a high frequency band no lower than the change point, sweeping the frequency in a non-linear manner such that the frequency changes steeply at a low frequency side and gradually at a high frequency side.

In a fifteenth aspect of the present invention based on the above twelfth aspect, the measurement signal is a signal which has two change points and which is generated by, in a frequency band between each of the change points, sweeping a frequency of the signal in a non-linear manner such that the frequency changes gradually at a low frequency side and steeply at a high frequency side, and in a frequency band other than the frequency band between each of the two change points, sweeping the frequency by a fixed sweep amount.

In a sixteenth aspect of the present invention based on the above twelfth aspect, the measurement signal is a signal which has a plurality of change points and which is generated by, in each of frequency bands separated by the change points, sweeping a frequency of the signal by a fixed sweep amount, and the fixed sweep amount for each of the frequency bands decreases in accordance with a frequency increase from one of the frequency bands to another of the frequency bands.

In a seventeenth aspect of the present invention based on the above twelfth aspect, the measurement signal is a signal which has more than one change point and which is generated by, in each of frequency bands separated by change points, sweeping a frequency of the signal in either one of sweep manners, in one of which the frequency is swept in a non-linear manner such that the frequency changes gradually at a low frequency side and steeply at a high frequency side, and in another of which the frequency is swept in a non-linear manner such that the frequency changes steeply at the low frequency side and gradually at the high frequency side, and in still another of which the frequency is swept by a fixed sweep amount.

In an eighteenth aspect of the present invention based on the above eleventh aspect, the measurement signal is a random noise.

In a nineteenth aspect of the present invention based on the above eleventh aspect, the frequency spectrum of the background noise is such that an energy level of the background noise is substantially fixed in a high frequency band no lower than a predetermined frequency, and the measurement signal has the change point at which a frequency is the predetermined frequency, and a characteristic of the frequency spectrum of the measurement signal is such that the measurement signal has, in a high frequency band no lower than the predetermined frequency, an energy level no lower than a predetermined level with respect to the background noise.

A twenties aspect of the present invention is the sound field measuring device based on the above eleventh aspect. The sound field measuring device further comprises: a background noise measurement section for measuring the frequency spectrum of the background noise; a change point determination section for determining at least one change point based on the frequency spectrum of the background noise measured by the background noise measurement section; and a measurement signal generation section for generating the measurement signal based on the change point determined by the change point determination section.

In a twenty-first aspect of the present invention based on the above eleventh aspect, the response signal measurement section has a plurality of microphones, and the calculation section calculates, for each of response signals measured by the plurality of microphones, either one of the impulse response and the transfer function of the sound field space.

A twenty-second aspect of the present invention is a program by which a computer of a sound field measuring device, which is for, by a convolution process using an inverse filter for converting a non-impulse measurement signal into an impulse, measuring either one of an impulse response and a transfer function of a sound field space which is a linear time-invariant system to be measured, is caused to perform: a measurement signal storage step of, in a storage section included in the sound field measuring device, storing, as the measurement signal, a signal having at least one change point at which a characteristic of a frequency spectrum of the measurement signal changes such that a shape of the frequency spectrum corresponds to a frequency spectrum of a background noise of the sound field space; a measurement signal reproduction step of reproducing in the sound field space the measurement signal stored in the storage section; a response signal measurement step of measuring a response signal provided from the sound field space which is responsive to the measurement signal reproduced at the measurement signal reproduction step; and a calculation step of, for the response signal measured at the response signal measurement step, calculating either one of the impulse response and the transfer function of the sound field space by the convolution process using the inverse filter.

A twenty-third aspect of the present invention is an integrated circuit for, by a convolution process using an inverse filter for converting a non-impulse measurement signal into an impulse, measuring either one of an impulse response and a transfer function of a sound field space which is a linear time-invariant system to be measured, the integrated circuit comprising: a measurement signal storage section for storing, as the measurement signal, a signal having at least one change point at which a characteristic of a frequency spectrum of the measurement signal changes such that a shape of the frequency spectrum corresponds to a frequency spectrum of a background noise of the sound field space; an output terminal for outputting the measurement signal stored in the measurement signal storage section to a measurement signal reproduction section reproducing the measurement signal in the sound field space; an input terminal for inputting an output from a response signal measurement section measuring a response signal provided from the sound field space which is responsive to the measurement signal reproduced by the measurement signal reproduction section; and a calculation section for calculating, for the response signal inputted from the input terminal, either one of the impulse response and the transfer function of the sound field space by the convolution process using the inverse filter.

EFFECT OF THE INVENTION

According to the above first aspect, the frequency spectrum of the measurement signal has at least one change point such that the shape of the frequency spectrum corresponds to the frequency spectrum of the background noise of the sound field space, and as a result, a high S/N ratio is obtained between the measurement signal and the frequency spectrum of the background noise. This allows a sound field measurement to be performed in which a high S/N ratio is obtained over a wide frequency band, e.g., from 20 Hz to 100 kHz.

According to the above second embodiment, the sinusoidal signal is used whose frequency is swept by different sweep manners at respective frequencies higher and lower than the change point, and this allows an energy level of the sinusoidal signal to be easily adjusted between frequency bands respectively higher and lower than the frequency of the change point. As a result, the measurement signal, which has a frequency spectrum corresponding to the shape of the frequency spectrum of the background noise of the sound field to be measured, can be easily generated, and this allows the measurement to be performed in which a high S/N ratio is obtained.

According to the above third aspect, the measurement signal is a signal having a frequency spectrum corresponding to the frequency spectrum of a general background noise whose energy level is high in a low frequency band and substantially fixed in a high frequency band. This allows the measurement to be performed in which a high S/N ratio is obtained particularly in the high frequency band where the energy level is substantially fixed.

According to the above fourth aspect, in the high frequency band no lower than the change point, a characteristic of the frequency spectrum of the measurement signal is such that the energy level of the measurement signal increases in accordance with an increase in frequency. This alleviates a problem caused by viscous resistance of air in that energy attenuation increases in accordance with an increase infrequency. This allows the sound field measurement to be performed in which an S/N ratio stably high over a wider frequency band is obtained.

According to the above fifth aspect, used as the measurement signal is a signal which allows a desired S/N ratio to be obtained for the shape of the frequency spectrum of the background noise, and this allows the measurement to be performed in which the desired S/N ratio is obtained.

According to the above sixth aspect, the frequency spectrum of the measurement signal is such that in each of the frequency bands separated by the change points, the measurement signal has an energy level corresponding to the energy level of the background noise. This allows the measurement to be performed in which a desired S/N ratio is obtained for each of the frequency bands.

According to the above seventh aspect, the energy level and a required S/N ratio may be freely set, in accordance with the shape of the frequency spectrum of the background noise, for each of the frequency bands separated by the change points.

According to the above eighth aspect, the measurement signal, which allows a high S/N ratio to be obtained, may be configured by a random noise.

According to the above ninth aspect, the measurement in which a high S/N ratio is obtained may be performed in the high frequency band no lower than the predetermined frequency in which a sufficient S/N ratio cannot be obtained in a conventional manner.

According to the above tenth aspect, the measurement signal is generated in accordance with an actual measurement value of the frequency spectrum of the background noise, and this allows the sound field measurement to be performed with a high precision in which a high S/N ratio is obtained.

According to the above twenty-first aspect, the sound field measurement in which a high S/N ratio is obtained may be performed in a space, e.g., a space whose size is equivalent to that of a human head, for which an impulse response or transfer function is required to be measured in various positions.

DESCRIPTION OF THE REFERENCE CHARACTERS 1 general-purpose PC
2 CPU
3 internal memory
4 hard disk
5 sound card
6 mouse
7 key board
8 display
9 sound field space
10 amplifier
11 speaker
12 microphone

BEST MODE FOR CARRYING OUT THE INVENTION

Hereinafter, embodiments of the present invention will be described with reference to the drawings.

First Embodiment

Figure 1:
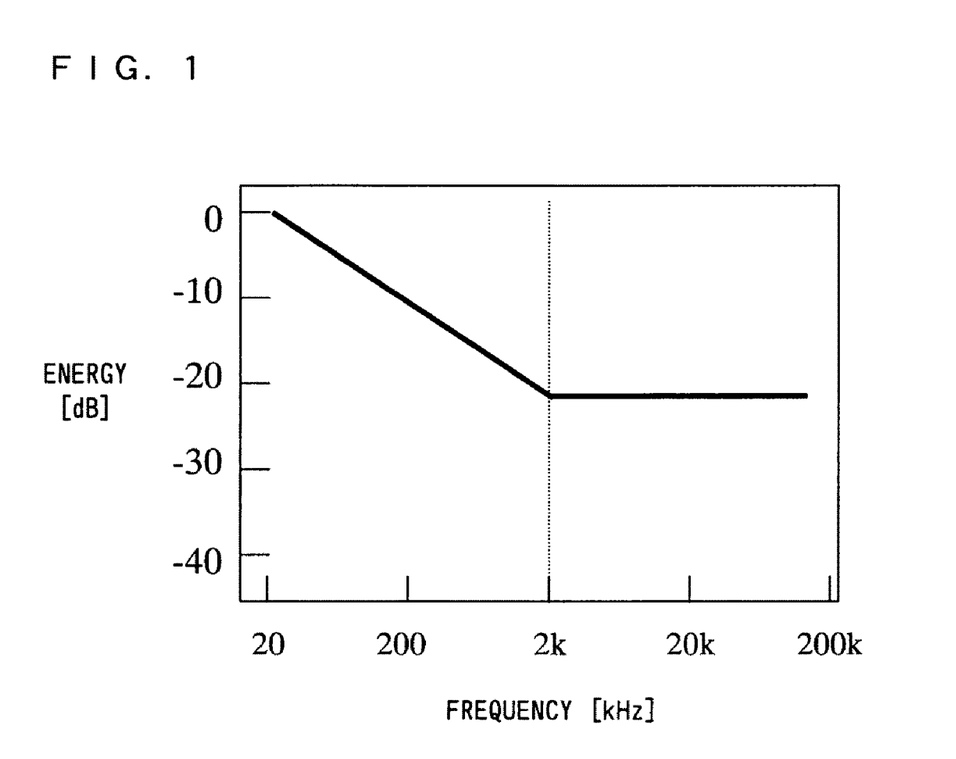
FIG. 1 shows an exemplary frequency spectrum of a measurement signal according to the present invention.

First, a measurement signal according to the present invention will be described with reference to FIG. 1. FIG. 1 shows an exemplary frequency spectrum of the measurement signal according to the present invention.

Generally, a frequency spectrum of a background noise (hereinafter, referred to as a background noise spectrum) is such that an energy level of the background noise is high at a low frequency. The background noise contains sound energy existing in a sound field space, for which an impulse response is measured, and distortion of a mechanical or electrical system included in a measuring system of the entire sound field measuring device. The background noise spectrum as shown in FIG. 10 shows the energy level increasing in a frequency band A in accordance with a decrease in frequency. However, in a frequency band B, the background noise spectrum shows the energy level substantially fixed regardless of the frequency.

Thus, the background noise spectrum does not simply decrease in accordance with an increase in frequency over the entire frequency bands. Therefore, as described in the problem of the conventional technique, when such a sinusoidal signal as shown in FIG. 11 which is simply swept in logarithmic proportion to the frequency is used as a measurement signal to measure a sound field, the energy level of the measurement signal is low particularly at a high frequency band no lower than 20 kHz, and this causes a considerable difficulty in measuring with a high S/N ratio.

Therefore, the present invention intends to cause the frequency spectrum of the measurement signal to have, in accordance with a shape of the background noise spectrum of FIG. 10, different frequency characteristics respectively for high and low frequencies as shown in FIG. 1. The measurement signal shown in FIG. 1 according to the present invention has a frequency spectrum showing that in accordance with the shape of the background noise spectrum shown in FIG. 10, an energy level of the measurement signal increases in accordance with a decrease in frequency in a frequency band no higher than 2 kHz and is fixed regardless of the frequency in a frequency band no lower than 2 kHz. Since the measurement signal having such a frequency spectrum has an energy level which does not decrease and which stays fixed even if the frequency increases, a measurement with a high S/N ratio at a high frequency band no lower than 20 kHz is of course possible.

In order to generate the measurement signal having the frequency spectrum shown in FIG. 1, a sinusoidal signal is used in which a particular frequency is set as a change point for frequency sweep and frequency sweeps are performed respectively by different manners at frequencies respectively higher and lower than the change point. In other words, the measurement signal shown in FIG. 1 according to the present invention is not a same signal as the conventional measurement signal shown in FIG. 11 on which frequency sweeps are performed in a uniform manner over the entire frequency bands which are a measurement target, but a signal on which frequency sweeps are, while a particular frequency is used as the change point, performed respectively by different manners at frequencies respectively higher and lower than the change point. It is assumed here that the change point is a point on a semi-logarithmic graph in which a frequency is represented by a semi-logarithmic axis, and a degree of change of a frequency spectrum (i.e., a characteristic of the frequency spectrum) changes at the change point. To be more specific, the conventional measurement signal shown in FIG. 11 is generated by a non-linear (logarithmically proportional)

sweep such that within the entire frequency bands which are a measurement target, the frequency of the conventional measurement signal changes gradually at a low-frequency side and steeply at a high-frequency side. On the other hand, the measurement signal shown in FIG. 1 according to the present invention is generated, while using the change point as a boundary, by a non-linear (logarithmically proportional) sweep performed at a frequency band lower than the change point and by a linear (fixed) sweep performed at a frequency band no lower than the change point.

Hereinafter, a manner of generating the measurement signal according to the present invention will be described in more detail. The measurement signal shown in FIG. 1 according to the present invention is generated using equations (1) to (4) provided below. There is a sample point i (i=0, 1, 2, ..., (n−1)), and also a sample point k (0<k<n−1) at which a sweep frequency is the change point. Here, in a frequency band lower than the change point (i<k), a frequency is swept in a non-linear (logarithmically proportional) manner such that the frequency changes gradually at a low frequency side and steeply at a high frequency side. In other words, the frequency is swept in a non-linear (logarithmically proportional) manner such that a sweep amount (i.e., sweep frequency per unit time) increases in accordance with an increase in the frequency. In this case, s sweep frequency Freq(i) at the sample point i is represented by the equation (1).

$$\mathrm{Freq}(i)=f1*\exp((\log(fc)-\log(f1))*i/k) \quad (1)$$

Here, in the equation (1), f1 is a sweep start frequency, and fc is a frequency at the change point.

In a frequency band no lower than the change point (k≦i), the frequency is swept in a linear manner in accordance with the equation (2), that is, the frequency is swept by a predetermined sweep amount (e.g., 10 Hz per unit time).

$$\mathrm{Freq}(i)=fc+(f2-fc)*(i-k)/(n-1-k) \quad (2)$$

Here, in the equation (2), f2 is a sweep end frequency.

Further, when a phase ang(i) is set to be continuous over all sample points T(i) (0<i<n−1) including sample points higher and lower than the change point, the phase ang(i) is represented by the equation (3).

$$\mathrm{ang}(i)=\mathrm{ang}(i-1)+2\pi*\mathrm{Freq}(i)/fs \quad (3)$$

Here, in the equation (3), fs represents a sampling frequency, and ang(0)=0.

In this case, a temporal waveform, at the sample point T (i), of the measurement signal having the frequency spectrum as shown in FIG. 1 is represented by the equation (4).

$$T(i)=\sin(\mathrm{ang}(i)) \quad (4)$$

Figure 2:
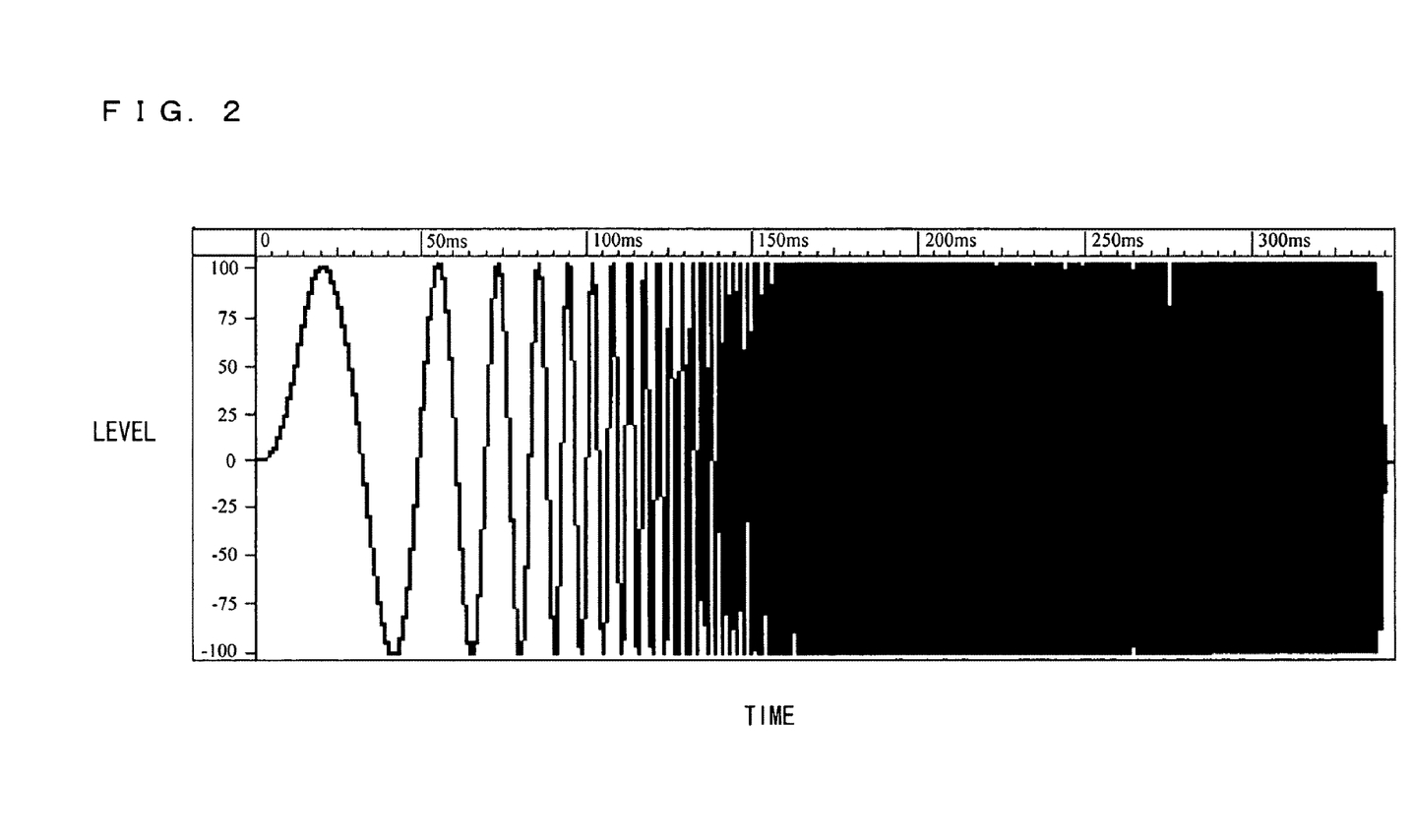
FIG. 2 shows a temporal waveform of the measurement signal calculated using equations (1) to (4).

FIG. 2 shows the temporal waveform of the measurement signal which is calculated by setting the frequency at the change point to, e.g., 2 kHz and using the above equations (1) to (4). Here, a temporal waveform having a wavelength of 0.5 msec (i.e., a temporal waveform of 2 kHz) is the temporal waveform at the change point. In the frequency band lower than the change point, the temporal waveform changes in accordance with the frequency changing in logarithmic proportion. In the frequency band higher than the change point, the temporal waveform changes in accordance with the frequency changing with a fixed sweep amount.

Figure 3:
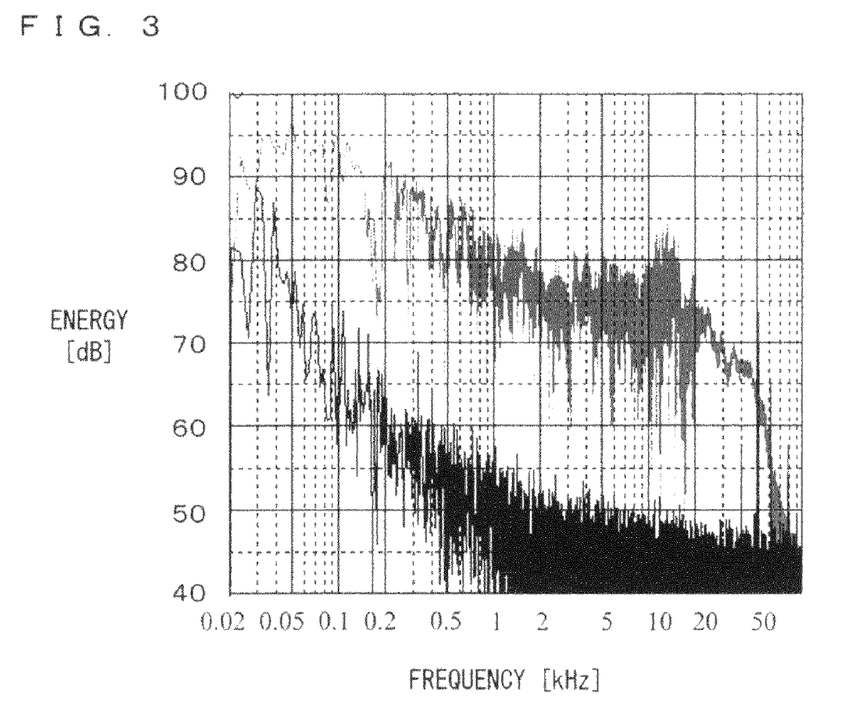
FIG. 3 shows a frequency spectrum of a response signal measured using the measurement signal according to the present invention.

FIG. 3 shows a frequency spectrum of a response signal which is measured when the measurement signal, which is generated by setting the frequency at the change point to, e.g., 2 kHz and using the above equations (1) to (4), is reproduced in a sound field space. FIG. 3 is a diagram showing the frequency spectrum of the response signal measured by using the measurement signal according to the present invention. As shown in FIG. 3, since the sound field measurement is performed using the measurement signal having a fixed energy level in the frequency band no lower than the change point, the sound field measurement in which a high S/N ratio is obtained is realized without causing a response component of the measurement signal to be buried in the background noise spectrum.

As described above, the measurement signal according to the present invention has the change point in accordance with the shape of the background noise spectrum, and this enables the sound field measurement to be performed in which a high S/N ratio is obtained from a low tone to a frequency band no lower than 20 kHz. Also, by changing the manner of frequency sweep between the frequency bands higher and lower than the change point, the energy level of the measurement signal can be easily adjusted between these frequency bands. As a result, the measurement signal corresponding to the shape of the background noise spectrum of the sound field to be measured can be easily generated, and the sound field can be measured with a high S/N ratio.

Figure 4:
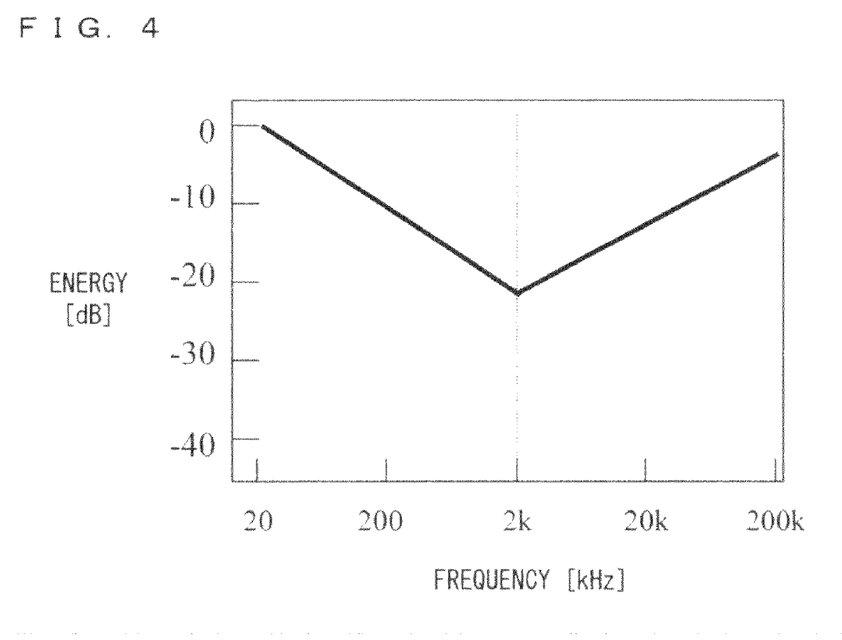
FIG. 4 shows another exemplary frequency spectrum of the measurement signal according to the present invention.
Figure 5:
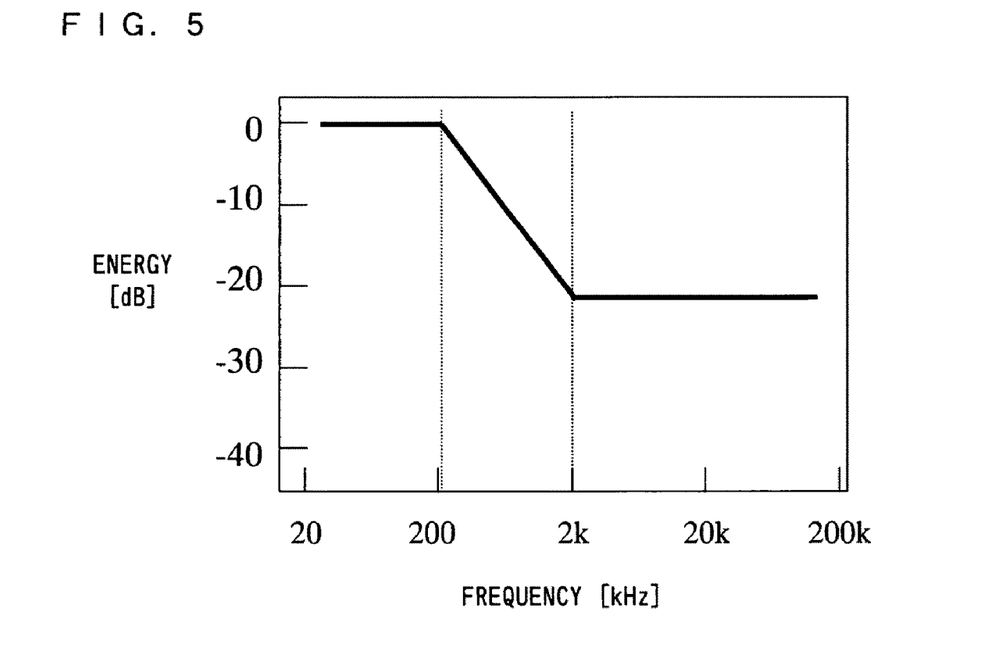
FIG. 5 shows another further exemplary frequency spectrum of the measurement signal according to the present invention.
Figure 6:
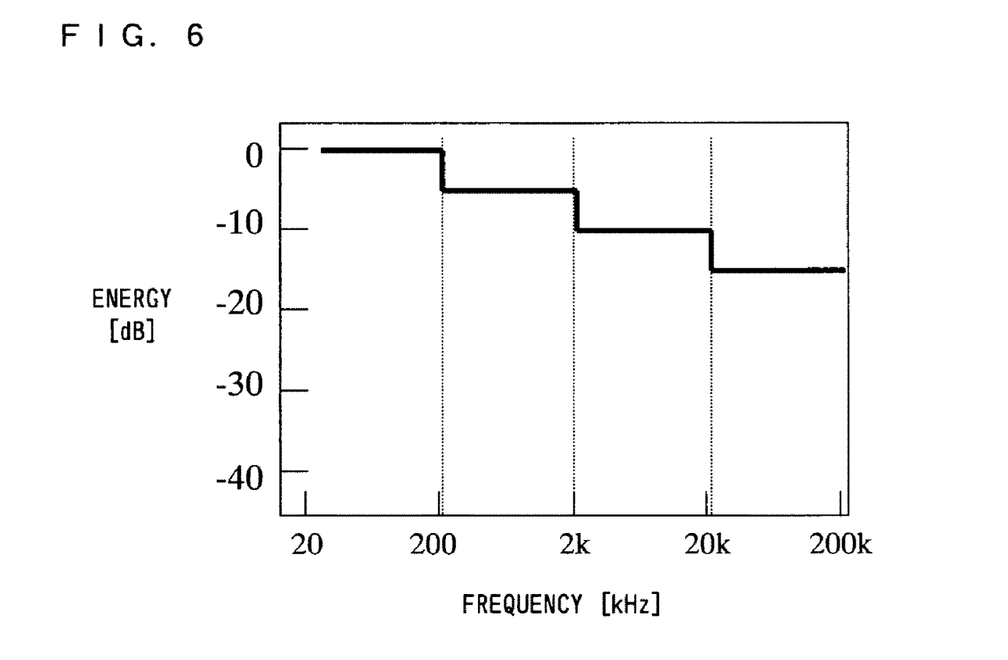
FIG. 6 shows another further exemplary frequency spectrum of the measurement signal according to the present invention.

The measurement signal according to the present invention is not limited to a signal having such a frequency spectrum as shown in FIG. 1. A signal, which is generated such that the frequency spectrum thereof has one or more change points and the shape corresponding to the shape of the background noise spectrum, may be used as the measurement signal. For example, the measurement signal according to the present invention may have such a frequency spectrum as shown in FIG. 4, 5 or 6. FIGS. 4 to 6 show other examples of the frequency spectrum of the measurement signal according to the present invention.

For example, the frequency spectrum shown in FIG. 4 has one change point at 2 kHz. In a frequency band lower than this change point, the frequency of the sinusoidal signal is swept in a non-linear manner such that the frequency changes gradually at a low frequency side and steeply at a high frequency side. In a frequency band no lower than the change point, the frequency of the sinusoidal signal is swept in a non-linear manner such that the frequency changes steeply at a low frequency side and gradually at a high frequency side. In other words, the frequency is swept such that a change in the frequency becomes more gradual (i.e., such that a sweep amount is decreased) in accordance with an increase in the frequency. In general, the higher the frequency, the more inclined to attenuate due to viscous resistance of air is the energy of a response signal. However, when the measurement signal having the frequency spectrum as shown in FIG. 4 is used, the above-mentioned energy attenuation of the response signal can be negated since the energy level of the measurement signal is high in the high frequency band no lower than the change point, and this realizes the sound field measurement in which a higher S/N ratio is obtained.

The frequency spectrum shown in FIG. 5 has change points at 200 Hz and 2 kHz, for example. At a frequency band lower than 200 Hz, the frequency of the sinusoidal signal is swept with a fixed sweep amount. In a frequency band from 200 Hz to 2 kHz, the frequency of the sinusoidal signal is swept in a non-linear manner such that the frequency changes gradually at a low frequency side and steeply at a high frequency side. In a high frequency band no lower than 2 kHz, the frequency of the sinusoidal signal is swept again with the fixed sweep amount.

The frequency spectrum shown in FIG. 6 has change points at 200 Hz, 2 kHz and 20 kHz, for example. In each frequency band, i.e., no higher than 200 Hz, from 200 Hz to 2 kHz, from 2 kHz to 20 kHz and from 20 kHz to 200 kHz, the frequency of the sinusoidal signal is swept with a fixed sweep amount. Here, values of sweep amounts in the respective frequency bands differ from each other at each change point. Also, the values of sweep amounts in the respective frequency bands are such that the higher the frequency band, the less the value of sweep amount, and therefore, the higher the frequency band, the less the energy level of the sinusoidal signal. For example, in the frequency band lower than 200 Hz, the energy level is fixed at 0 dB, whereas in the frequency band from 200 Hz to 2 kHz, the energy level is fixed at −5 B. Thus, the energy level changes. By changing the amount of linear sweep (i.e., changing the manner of sweep) at the change point of 200 Hz as described above, the degree of change (the characteristic) of the frequency spectrum is changed from 0 dB fixed to −5 dB fixed. For the frequency spectrum shown in FIG. 6, the energy level can be freely set for each frequency band, e.g., the energy level for a high frequency band may be set such that an S/N ratio of at least 10 dB is obtained.

As described above, the measurement signal having the frequency spectrum shown in FIG. 4, 5 or 6 can be generated by sequentially performing a calculation for each of all the frequency bands divided by the change points while selecting and using the above equation (1) in the case of logarithmic sweep and the above equation (2) in the case of linear sweep.

In the present invention, the measurement signal has at least one change point, thereby having a frequency spectrum corresponding to the shape of the background noise spectrum. Here, in the frequency band no lower than 20 kHz which is beyond the scope of assumption in conventional arts, the energy level of the background noise spectrum is fixed as shown in FIG. 10. Accordingly, by setting the characteristic of the frequency spectrum of the measurement signal according to the present invention such that the energy level of the measurement signal is fixed at a predetermined level or increases in a frequency band no lower than at least 20 kHz, a sound field can be measured while obtaining a high S/N ratio in the frequency band no lower than 20 kHz.

In the examples of the above-described frequency spectrums shown in FIGS. 1 and 4 to 6, the sweep is performed on the sinusoidal signal. However, the present invention is not limited thereto. As long as the measurement signal has a frequency spectrum which has at least one change point and whose shape corresponds to the shape of the background noise spectrum, the measurement signal may be, for example, a signal generated by a random noise. Further, although the frequency spectrums shown in FIGS. 1, 4 and 5 each have a shape continuous over the change point, the shape may be discontinuous over the change point as shown in FIG. 6.

Figure 7:
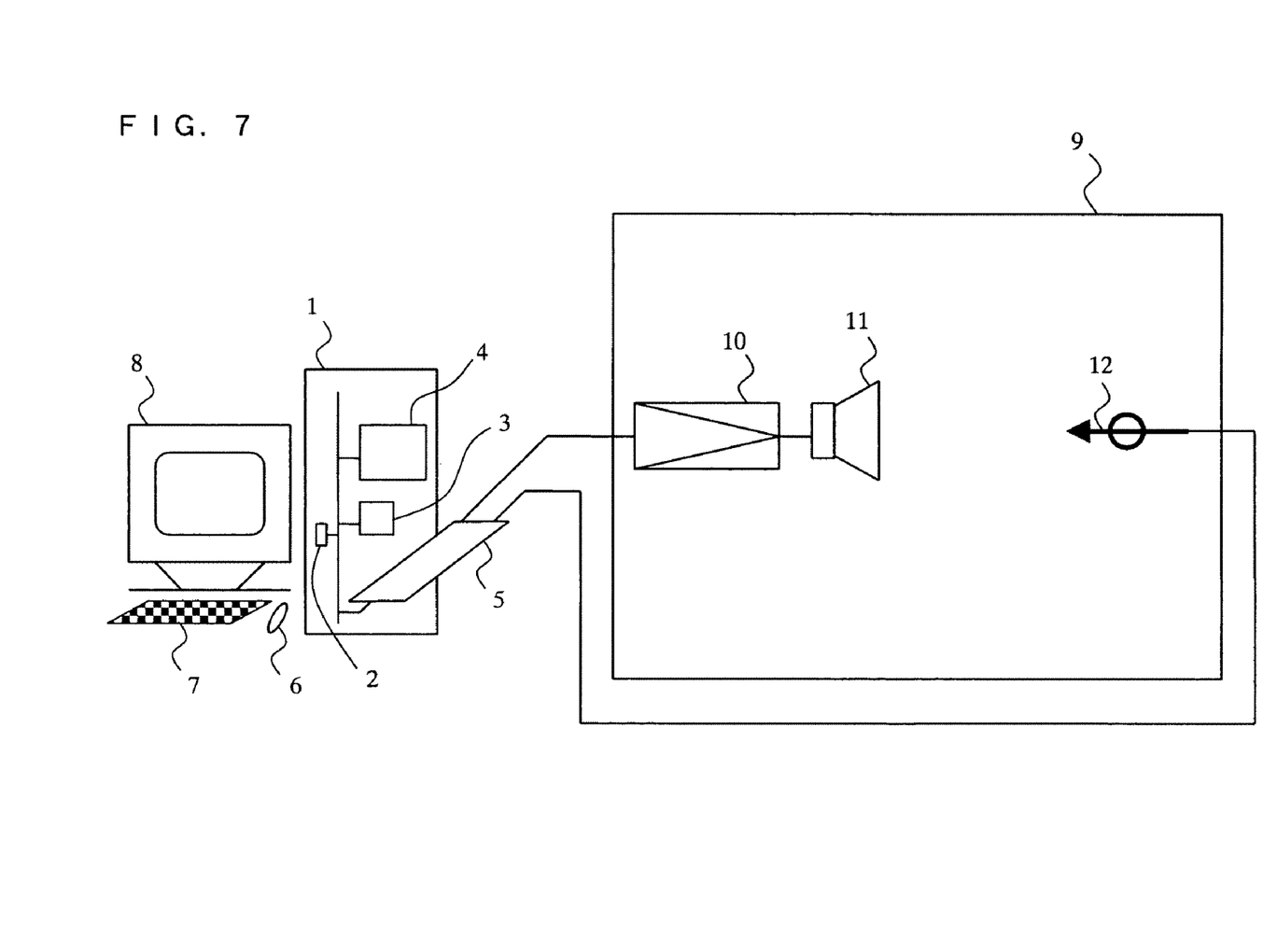
FIG. 7 is a schematic diagram showing an exemplary configuration of a sound field measuring device according to a first embodiment.
Figure 8:
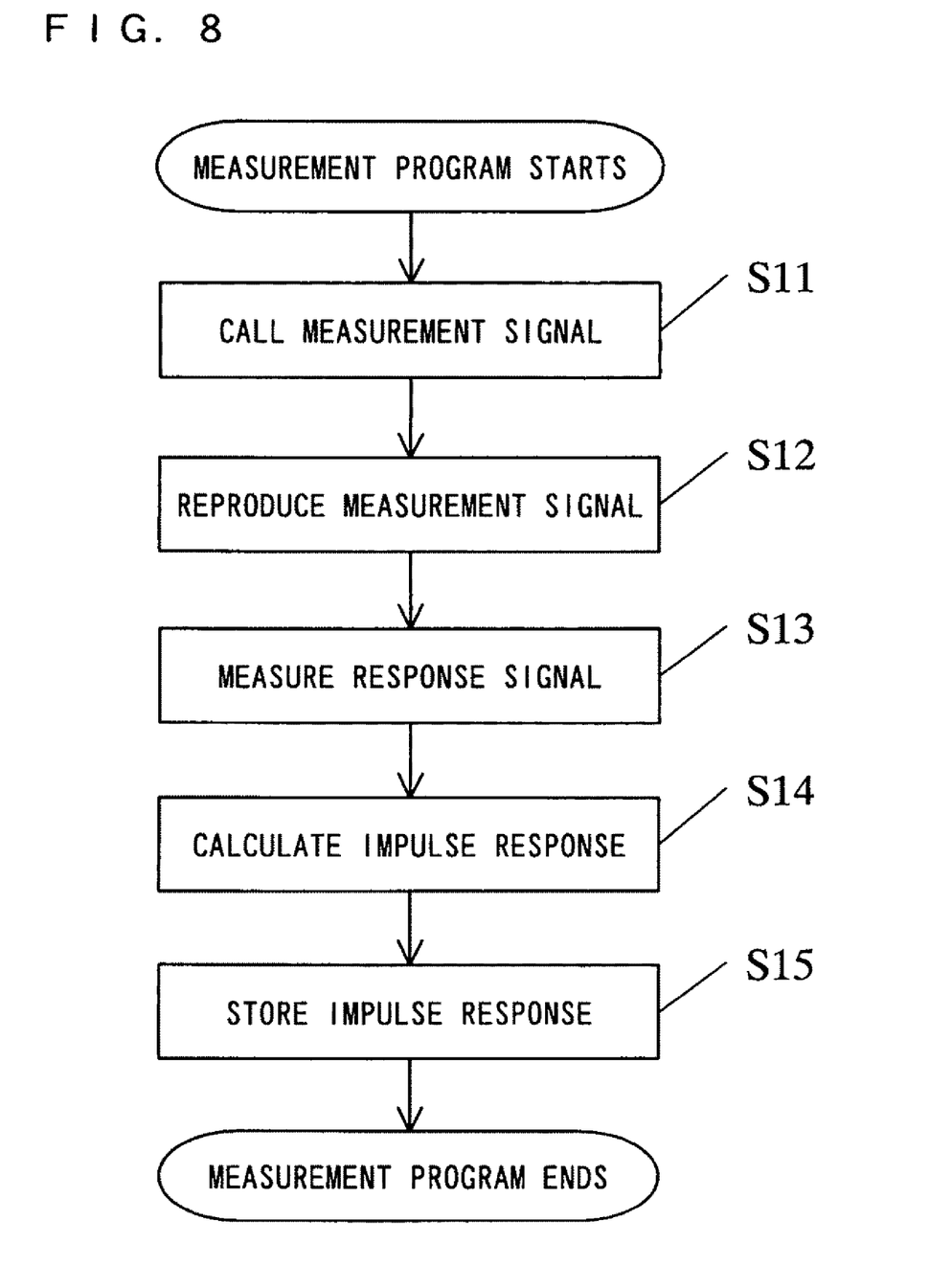
FIG. 8 is an operation flowchart of a measurement program for measuring an impulse response, which is operated on a general-purpose PC 1 in the sound field measuring device according to the first embodiment.

Next, the sound field measuring device according to the first embodiment of the present invention will be described with reference to FIGS. 7 and 8. The sound field measuring device according to the present embodiment uses the above-described measurement signal according to the present invention to measure an impulse response or transfer function of a sound field space. FIG. 7 is a schematic diagram showing an exemplary configuration of the sound field measuring device according to the first embodiment. In FIG. 7, the sound field measuring device comprises a general-purpose PC 1, CPU 2, internal memory 3, hard disk 4, sound card 5, mouse 6, keyboard 7, display 8, amplifier 10, speaker 11 and a microphone 12. FIG. 8 is an operation flowchart of a measurement program for measuring an impulse response, which is operated on the general-purpose PC in the sound field measuring device according to the first embodiment.

The speaker 11, microphone 12 and amplifier 10 are placed in a sound field space 9 for which the impulse response is measured. The amplifier 10 amplifies the measurement signal outputted from the sound card 5, and outputs the amplified measurement signal to the speaker 11. The speaker 11 reproduces the measurement signal outputted from the amplifier 10. The microphone 12 measures a response signal of the sound field space 9.

Hereinafter, operations of the sound field measuring device according to the present embodiment will be described with reference to FIG. 8. The sound field measuring device according to the present embodiment uses the general-purpose PC 1 as one of component elements thereof. The sound field measuring device according to the present embodiment calculates the impulse response of the sound field space 9 by the measurement program for measuring the impulse response, which is operated on the general-purpose PC 1. Here, a general-purpose computer with general specifications and capabilities is sufficient to be used as the general-purpose PC 1 of the sound field measuring device according to the present embodiment.

The hard disk 4 within the general-purpose PC 1 stores the above-mentioned measurement program for measuring the impulse response. It is assumed in the present embodiment that the hard disk 4 also prestores data of the frequency spectrum of the measurement signal shown in FIG. 1 according to the present invention.

At the start of measuring the impulse response, the CPU 2 performs a control such that the measurement program is loaded to the internal memory 3 and then executed. It is assumed here that the mouse 6, key board 7 and display 8, which are general input/output devices of the general-purpose PC 1, can be used to call and execute the measurement program and to select and perform later-described operations of the measurement program.

When the measurement program is executed, the data of the measurement signal stored in the hard disk 4 is called, and supplied from the sound card 5 to the amplifier 10 as an audio signal (step S11). Note that, the hard disk 4 may store a plurality of types of measurement signals, and an appropriate signal may be selected therefrom in accordance with a characteristic of the sound field space 9 and a frequency band to be measured.

After step S11, the measurement signal amplified by the amplifier 10 is reproduced in the sound field space 9 for which the speaker 11 measures the impulse response (step S12). The response signal based on the reproduced measurement signal is recorded by the microphone 12, and then loaded again to the internal memory 3 within the general-purpose PC 1 through the sound card 5 (step S13). The response signal based on the measurement signal which has been loaded to the internal memory is, in the measurement program, converted to an impulse by a convolution process using a filter having an opposite characteristic to that of the measurement signal reproduced in the sound field space 9, and the impulse response or transfer function of the sound field space 9 is calculated (step S14). A result of calculating the impulse response is stored in the hard disk 4 (step S15). The measurement program ends after performing the above process.

When the sound field measuring device according to the above-described present embodiment is described as comprising functional component sections, the sound field measuring device according to the present embodiment comprises a measurement signal storage section, measurement signal reproduction section, response signal measurement section and a calculation section. The measurement signal storage section is structured by the above-described hard disk 4. The measurement signal storage section stores the measurement signal according to the present invention. The measurement signal reproduction section is structured by the amplifier 10 and speaker 11 placed in the sound field space 9. The measurement signal reproduction section reproduces the measurement signal stored in the measurement signal storage section. The response signal measurement section measures the response signal responsive to the measurement signal reproduced by the microphone 12 in the sound field space. The calculation section is structured by the CPU 2 performing step S14. The calculation section performs a convolution process, by using a filter having an opposite characteristic to that of the measurement signal, on the response signal based on the measured measurement signal to convert the response signal into an impulse, and calculates the impulse response or transfer function of the sound field space 9.

As described above, the sound field measuring device according to the present embodiment uses the measurement signal having such a frequency spectrum as shown in FIG. 1 to measure the response signal of the sound field space 9. Therefore, the sound field measuring device according to the present embodiment is capable of, in all the frequency bands to be measured, measuring with a high S/N ratio the impulse response or transfer function of the sound field space which is a linear time-invariant system to be measured.

Note that, the microphone 12 for measuring the response signal of the sound field space 9 is not necessarily a single microphone unit. For example, a plurality of microphone units may be placed in a space whose size is equivalent to that of a human head, and each of the plurality of microphone units may measure the response signal of the sound field space 9 to calculate and store the impulse response.

Second Embodiment

Next, a sound field measuring device according to a second embodiment of the present invention will be described. Although the sound field measuring device according to the present embodiment is realized by a same configuration as that of the sound field measuring device according to the first embodiment shown in FIG. 7, the second embodiment is different from the first embodiment in that the measurement program for measuring the impulse response is differently operated on the general-purpose PC 1. To be specific, the present embodiment is different from the first embodiment in that in the present embodiment, the background noise of the measuring system is measured, and the measurement signal to be reproduced in the sound field space 9 is generated based on a result of the measurement. Hereinafter, a description is given with a focus on this difference.

Figure 9:
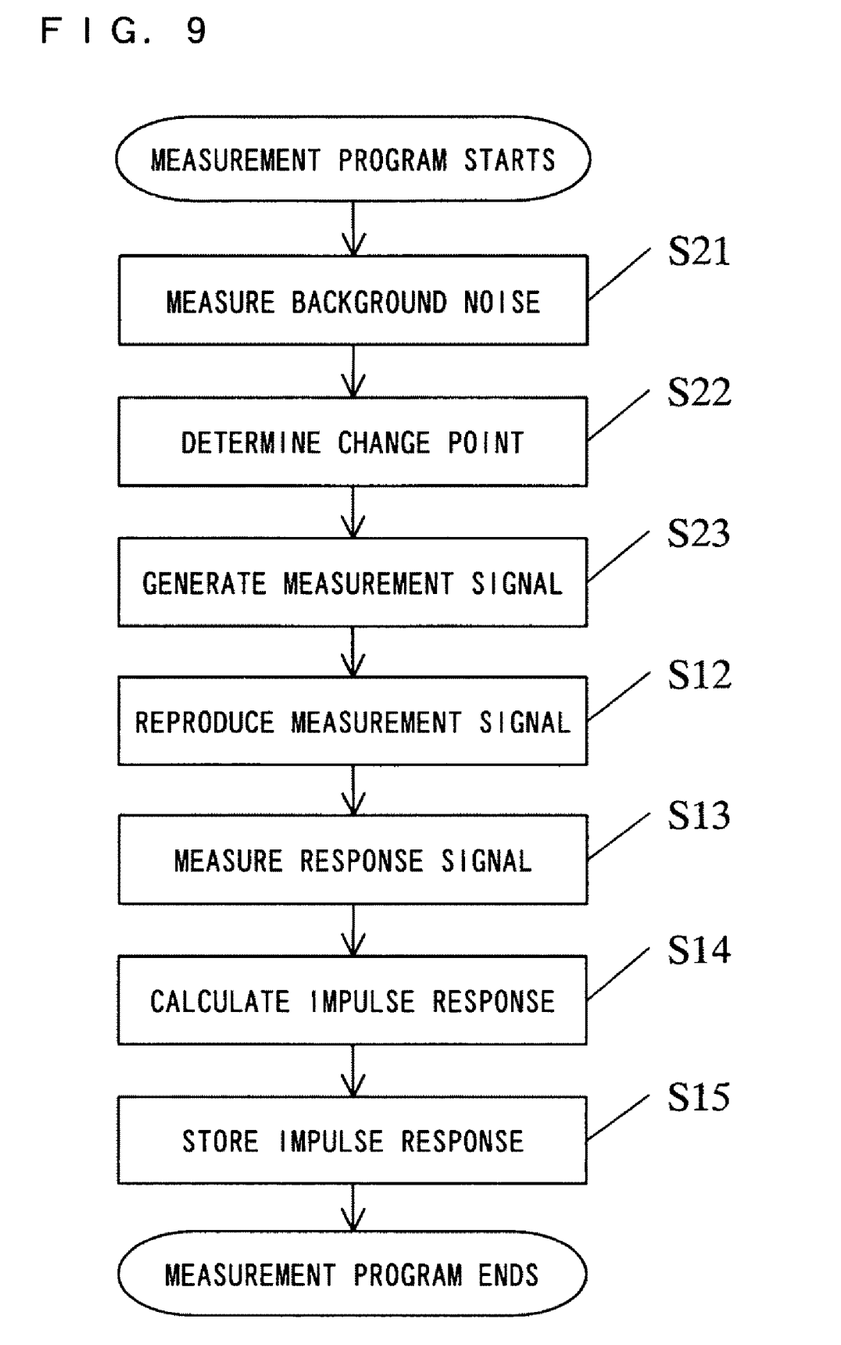
FIG. 9 is an operation flowchart of the measurement program for measuring the impulse response, which is operated on the general-purpose PC 1 in the sound field measuring device according to a second embodiment.

FIG. 9 is an operation flowchart of the measurement program for measuring the impulse response, which is operated on the general-purpose PC 1 in the sound field measuring device according to the second embodiment. Here, since operations from the reproduction of the measurement signal (step S12) to the storage of the impulse response (step S15) are same as those of the above-described first embodiment, the operations are denoted by same reference numerals as those used in the first embodiment, and descriptions thereof will be omitted.

When the measurement program is executed in the sound field measuring device according to the present embodiment, a background noise spectrum is first measured using the microphone 12 (step S21). Here, the background noise spectrum contains: sound energy existing in the sound field space 9 for which the impulse response is measured; and distortion and a noise component of a mechanical or electrical system included in the measuring system comprising the general-purpose PC 1, sound card 5, amplifier 10, speaker 11, microphone 12 and the like.

The background noise spectrum measured at step S21 is loaded to the internal memory 3 via the sound card 5, and a change point is determined based on a result of the measurement (step S22). Although the manner of determining the change point may be arbitrarily determined by an algorithm of the measurement program, the manner may be such that, e.g., a frequency spectrum of each octave of the background noise is sequentially calculated from a low frequency side, and a frequency, at which a difference in energy amount between adjacent octaves is equal to or lower than a predetermined value, is set as the change point. Also, the change point may be set such that, e.g., when the background noise spectrum is displayed on the display 8, a user arbitrarily sets the change point in accordance with the shape of the background noise spectrum.

By using the change point determined at step S22 and the above equations (1) to (4), the measurement signal having, e.g., the frequency spectrum shown in FIG. 1 is generated (step S23). The operations performed from step S11 at which this measurement signal is reproduced are same as those of the first embodiment.

When the sound field measuring device according to the above-described present embodiment is described as comprising functional component sections, the sound field measuring device according to the present embodiment, as compared with the sound field measuring device of the first embodiment, additionally comprises a background noise measurement section, background noise measurement section and measurement signal generation section. The background noise measurement section uses the microphone 12 to measure the background noise spectrum of the sound field space 9. The change point determination section is structured by the CPU 2 performing step S22. Based on the background noise spectrum measured by the background noise measurement section, the change point determination section determines at least one change point. The measurement signal generation section is structured by the CPU 2 performing step S23. Based on the change point determined by the change point determination section, the measurement signal generation section generates the measurement signal to be stored in the measurement signal storage section.

Similarly to the first embodiment, the microphone 12 for measuring the response signal of the sound field space is not necessarily a single microphone unit. For example, a plurality of microphone units may be placed in a space whose size is equivalent to that of a human head, and each of the plurality of microphone units may measure the response signal of the sound field space 9 to calculate and store the impulse response.

As described above, the sound field measuring device according to the present embodiment is allowed to precisely measure the impulse response by generating the measurement signal in accordance with the characteristics of the sound field space to be measured and the measuring system.

Note that, component elements of each of the above-described sound field measuring devices according to the first and second embodiments can be at least partly realized by an integrated circuit. In the sound field measuring device according to the first embodiment, the measurement signal storage section and calculation section may be realized by an integrated circuit, for example. In this case, the integrated circuit has an output terminal for outputting the measurement signal stored in the measurement signal storage section to the measurement signal reproduction section structured by the amplifier 10 or speaker 11, and also has an input terminal for inputting an output signal provided from the microphone 12. Further, in the sound field measuring device according to the second embodiment, the background noise measurement section, background noise measurement section and measurement signal generation section may be realized by an integrated circuit.

INDUSTRIAL APPLICABILITY

The sound field measuring method and sound field measuring device according to the present invention are useful as, e.g., a sound field measuring method and sound field measuring device capable of measuring a sound field with a high S/N ratio over a wide frequency band, e.g., from 20 Hz to 100 kHz.

The invention claimed is:

1. A sound field measuring method comprising:
  reproducing, with a speaker, a measurement signal in a sound field space, the measurement signal having a frequency spectrum in which an energy level of the measurement signal decreases in accordance with an increase in frequency in a frequency band having frequencies equal to or lower than a first frequency and does not decrease in accordance with an increase in frequency in a frequency band having frequencies equal to or higher than the first frequency;
  measuring, with a microphone, a response signal in the sound field space, the response signal being responsive to the measurement signal; and
  calculating, with a computer, for the response signal, either one of an impulse response and a transfer function of the sound field space by a convolution process using an inverse filter.

2. The sound field measuring method according to claim 1, wherein the measurement signal has a frequency spectrum in which the energy level of the measurement signal is constant in the frequency band having frequencies equal to or higher than the first frequency.

3. The sound field measuring method according to claim 1, wherein the measurement signal has a frequency spectrum in which the energy level of the measurement signal increases in accordance with an increase in frequency in the frequency band having frequencies equal to or higher than the first frequency.

4. The sound field measuring method according to claim 1, wherein the measurement signal has a frequency spectrum in which changes in the energy level of the measurement signal in relation to frequencies in a frequency band having the frequencies equal to or lower than a second frequency that is lower than the first frequency, are more gradual than changes in the energy level of the measurement signal in relation to frequencies in a frequency band from the second frequency to the first frequency.

5. The sound field measuring method according to claim 1, wherein
  in the frequency band having frequencies equal to or lower than the first frequency, the energy level of the measurement signal decreases in a step-like manner at frequencies including at least one predetermined frequency lower than the first frequency.

6. The sound field measuring method according to claim 1, wherein
  in the frequency band having frequencies equal to or higher than the first frequency, the energy level of the measurement signal at each frequency is greater than that of a background noise at least by a predetermined energy level.

7. The sound field measuring method according to claim 1, further comprising:
  measuring a frequency spectrum of a background noise;
  determining the first frequency based on the measured frequency spectrum of the background noise; and
  generating the measurement signal based on the first frequency.

8. A sound field measuring device comprising:
  a measurement signal storage section for storing a measurement signal having a frequency spectrum in which an energy level of the measurement signal decreases in accordance with an increase in frequency in a frequency band having frequencies equal to or lower than a first frequency and does not decrease in accordance with an increase in frequency in a frequency band having frequencies equal to or higher than the first frequency;
  a measurement signal reproduction section for reproducing the measurement signal in a sound field space;
  a response signal measurement section for measuring a response signal provided from the sound field space, the response signal being responsive to the measurement signal; and
  a calculation section for calculating, for the response signal, either one of an impulse response and a transfer function of the sound field space by a convolution process using an inverse filter.

9. The sound field measuring device according to claim 8, wherein the measurement signal has a frequency spectrum in which the energy level of the measurement signal is constant in the frequency band having frequencies equal to or higher than the first frequency.

10. The sound field measuring device according to claim 8, wherein the measurement signal has a frequency spectrum in which the energy level of the measurement signal increases in accordance with an increase in frequency in the frequency band having frequencies equal to or higher than the first frequency.

11. The sound field measuring device according to claim 8, wherein the measurement signal has a frequency spectrum in which changes in the energy level of the measurement signal in relation to frequencies in a frequency band having the frequencies equal to or lower than a second frequency that is lower than the first frequency, are more gradual than changes in the energy level of the measurement signal in relation to frequencies in a frequency band from the second frequency to the first frequency.

12. The sound field measuring device according to claim 8, wherein
  in the frequency band having frequencies equal to or lower than the first frequency, the energy level of the measurement signal decreases in a step-like manner at frequencies including at least one predetermined frequency lower than the first frequency.

13. The sound field measuring device according to claim 8, wherein
  in the frequency band having frequencies equal to or higher than the first frequency, the energy level of the measurement signal at each frequency is greater than that of a background noise at least by a predetermined energy level.

14. The sound field measuring device according to claim 8, further comprising:
  a background noise measurement section for measuring a frequency spectrum of a background noise;

a change point determination section for determining the first frequency based on the frequency spectrum of the background noise measured by the background noise measurement section; and a measurement signal generation section for generating the measurement signal based on the first frequency determined by the change point determination section.

15. The sound field measuring device according to claim 8, wherein
the response signal measurement section has a plurality of microphones, and
the calculation section calculates, for each of response signals measured by the plurality of microphones, either one of the impulse response and the transfer function of the sound field space.

16. A non-transitory computer-readable storage medium having a program stored therein which causes a computer to perform a method comprising:
storing a measurement signal having a frequency spectrum in which an energy level of the measurement signal decreases in accordance with an increase in frequency in a frequency band having frequencies equal to or lower than a first frequency and does not decrease in accordance with an increase in frequency in a frequency band having frequencies equal to or higher than the first frequency;
the measurement signal in a sound field space;
measuring a response signal provided from the sound field space, the response signal being responsive to the measurement signal; and
calculating, for the response signal, either one of an impulse response and a transfer function of the sound field space by a convolution process using an inverse filter.

17. An integrated circuit comprising:
a measurement signal storage section for storing a measurement signal having a frequency spectrum in which an energy level of the measurement signal decreases in accordance with an increase in frequency in a frequency band having frequencies equal to or lower than a first frequency and does not decrease in accordance with an increase in frequency in a frequency band having frequencies equal to or higher than the first frequency;
a measurement signal reproduction section for reproducing the measurement signal in a sound field space;
a response signal measurement section for measuring a response signal provided from the sound field space, the response signal being responsive to the measurement signal; and
a calculation section for calculating, for the response signal, either one of an impulse response and a transfer function of the sound field space by a convolution process using an inverse filter.

* * * * *

UNITED STATES PATENT AND TRADEMARK OFFICE
CERTIFICATE OF CORRECTION

| | | |
|---|---|---|
| PATENT NO. | : 7,831,413 B2 | Page 1 of 1 |
| APPLICATION NO. | : 11/663544 | |
| DATED | : November 9, 2010 | |
| INVENTOR(S) | : Toshihiko Date et al. | |

It is certified that error appears in the above-identified patent and that said Letters Patent is hereby corrected as shown below:

IN THE CLAIMS

In column 17, claim 16, line 27, "the measurement" should read --reproducing the measurement--.

Signed and Sealed this
Twenty-ninth Day of March, 2011

David J. Kappos
*Director of the United States Patent and Trademark Office*